United States Patent
Singla et al.

(10) Patent No.: US 10,356,109 B2
(45) Date of Patent: Jul. 16, 2019

(54) SECURITY INDICATOR LINKAGE DETERMINATION

(71) Applicant: HEWLETT PACKARD ENTERPRISE DEVELOPMENT LP, Houston, TX (US)

(72) Inventors: Anurag Singla, Sunnyvale, CA (US); Edward Ross, Austin, TX (US); Brian Frederik Hosea Che Hein, Alliso Viejo, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 166 days.

(21) Appl. No.: 15/328,018

(22) PCT Filed: Jul. 21, 2014

(86) PCT No.: PCT/US2014/047445
§ 371 (c)(1),
(2) Date: Jan. 21, 2017

(87) PCT Pub. No.: WO2016/014021
PCT Pub. Date: Jan. 28, 2016

(65) Prior Publication Data
US 2017/0187730 A1    Jun. 29, 2017

(51) Int. Cl.
*H04L 29/06* (2006.01)
*G06F 21/55* (2013.01)
*G06F 21/57* (2013.01)

(52) U.S. Cl.
CPC ........ *H04L 63/1416* (2013.01); *G06F 21/552* (2013.01); *G06F 21/554* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 7,530,105 B2 | 5/2009 | Gilbert et al. | |
| 7,694,150 B1 * | 4/2010 | Kirby | G06F 21/55 713/188 |

(Continued)

FOREIGN PATENT DOCUMENTS

| | | |
|---|---|---|
| KR | 1020030051994 A | 6/2003 |
| KR | 100819049 B1 | 4/2008 |
| WO | WO-2012/172039 | 12/2012 |

OTHER PUBLICATIONS

Walters et al., "A Framework for Mitigating Attacks Against Measurement-Based Adaptation Mechanisms in Unstructured Multicast Overlay Networks", IEEE/ACM Transactions on Networking, vol. 16, Issue: 6, Dec. 2008.*

(Continued)

*Primary Examiner* — Piotr Poltorak

(57) ABSTRACT

According to an example, security indicator linkage determination may include parsing input data that is used to determine a plurality of sequences of steps that are involved in attacks. A linkage selected from temporal, spatial, and/or behavioral linkages may be applied to the parsed input data to determine the plurality of sequences of steps. A security indicator that is related to a potential attack may be received. The plurality of sequences of steps may be used to determine whether the security indicator matches a step in one of the plurality of sequences of steps. In response to a determination that the security indicator matches a step in one of the plurality of sequences of steps, linkage between the security indicator and another security indicator from the one of the plurality of sequences of steps that are involved in the attacks may be identified.

21 Claims, 4 Drawing Sheets

(52) U.S. Cl.
CPC ........ *G06F 21/577* (2013.01); *H04L 63/1433* (2013.01); *G06F 2221/034* (2013.01)

(56) References Cited

U.S. PATENT DOCUMENTS

| | | | |
|---|---|---|---|
| 7,735,116 B1 | 6/2010 | Gauvin | |
| 7,748,040 B2 | 6/2010 | Adelstein et al. | |
| 8,291,495 B1 | 10/2012 | Burns et al. | |
| 8,407,798 B1* | 3/2013 | Lotem | G06F 21/55 726/18 |
| 8,494,985 B1* | 7/2013 | Keralapura | H04L 63/0245 706/12 |
| 8,516,576 B2 | 8/2013 | Figlin et al. | |
| 9,401,925 B1* | 7/2016 | Guo | H04L 63/1416 |
| 9,413,777 B2* | 8/2016 | Zuk | H04L 63/1425 |
| 9,916,445 B2* | 3/2018 | Ijiro | G06F 21/55 |
| 10,142,357 B1* | 11/2018 | Tamersoy | H04L 63/1416 |
| 2002/0157020 A1* | 10/2002 | Royer | H04L 63/1425 726/11 |
| 2003/0145225 A1* | 7/2003 | Bruton, III | H04L 63/1408 726/23 |
| 2003/0154402 A1* | 8/2003 | Pandit | G06F 21/552 726/23 |
| 2004/0093510 A1 | 5/2004 | Nurmela | |
| 2004/0193943 A1* | 9/2004 | Angelino | H04L 63/1408 714/4.1 |
| 2004/0205474 A1* | 10/2004 | Eskin | H04L 63/1416 713/188 |
| 2005/0086538 A1* | 4/2005 | Kubota | G06F 21/552 726/4 |
| 2005/0257264 A1* | 11/2005 | Stolfo | G06F 21/552 726/23 |
| 2006/0156380 A1* | 7/2006 | Gladstone | G06F 21/52 726/1 |
| 2006/0259968 A1* | 11/2006 | Nakakoji | G06F 21/552 726/22 |
| 2007/0094728 A1* | 4/2007 | Julisch | H04L 63/1416 726/23 |
| 2007/0150427 A1* | 6/2007 | Geib | G06F 21/552 706/45 |
| 2007/0226796 A1* | 9/2007 | Gilbert | G06F 21/55 726/22 |
| 2011/0030059 A1* | 2/2011 | Greenwald | H04L 63/1416 726/25 |
| 2012/0198277 A1* | 8/2012 | Busser | H04L 63/1416 714/26 |
| 2012/0198541 A1* | 8/2012 | Reeves | H04L 63/0227 726/13 |
| 2013/0074143 A1 | 3/2013 | Bu et al. | |
| 2013/0091539 A1 | 4/2013 | Khurana et al. | |
| 2013/0333040 A1* | 12/2013 | Diehl | G06F 9/46 726/24 |
| 2014/0215616 A1* | 7/2014 | Bhatt | G06F 21/554 726/23 |
| 2015/0237063 A1* | 8/2015 | Cotton | H04L 63/1433 726/25 |
| 2015/0261958 A1* | 9/2015 | Hale | G06F 21/577 726/25 |
| 2016/0055334 A1* | 2/2016 | Herwono | G06F 21/554 726/23 |
| 2016/0103992 A1* | 4/2016 | Roundy | G06F 21/554 726/23 |

OTHER PUBLICATIONS

David T. Merritt, "Spear Phishing Attack Detection", THESIS Department of Electrical and Computer Engineering Graduate School of Engineering and Management Air Force Institute of Technology Air University, Mar. 2011.*

Roblee, et al. "Implementing Large-Scale Autonomic Server Monitoring Using Process Query Systems", Second International Conference on Autonomic Computing (ICAC'05), Jun. 2005.*

International Search Report and Written Opinion, International Application No. PCT/US2014/047445, dated Feb. 17, 2015, pp. 1-6, KIPO.

Li Wang et al., "Automatic Multi-step Attack Pattern Discovering," International Journal of Network Security, Mar. 2010, pp. 142-152, vol. 2, No. 2.

European Patent Office, Extended European Search Report for Appl. No. 14898226.7-1218 I 3172691 PCT/US201404 7445 dated Mar. 14, 2018 (7 pages).

* cited by examiner

200

```
┌─────────────────────────────────────────────────────────────┐
│  PARSE INPUT DATA THAT IS USED TO DETERMINE A PLURALITY     │
│      OF SEQUENCES OF STEPS THAT ARE INVOLVED IN ATTACKS     │
│                            202                              │
└─────────────────────────────────────────────────────────────┘
                              │
                              ▼
┌─────────────────────────────────────────────────────────────┐
│   APPLY A LINKAGE SELECTED FROM TEMPORAL, SPATIAL,          │
│  AND/OR BEHAVIORAL LINKAGES TO THE PARSED INPUT DATA        │
│    TO DETERMINE THE PLURALITY OF SEQUENCES OF STEPS         │
│           THAT ARE INVOLVED IN THE ATTACKS                  │
│                            204                              │
└─────────────────────────────────────────────────────────────┘
                              │
                              ▼
┌─────────────────────────────────────────────────────────────┐
│      RECEIVE A SECURITY INDICATOR THAT IS RELATED           │
│                  TO A POTENTIAL ATTACK                      │
│                            206                              │
└─────────────────────────────────────────────────────────────┘
                              │
                              ▼
┌─────────────────────────────────────────────────────────────┐
│   UTILIZE THE PLURALITY OF SEQUENCES OF STEPS THAT ARE      │
│     INVOLVED IN THE ATTACKS TO DETERMINE WHETHER THE        │
│  SECURITY INDICATOR MATCHES A STEP IN ONE OF THE PLURALITY  │
│    OF SEQUENCES OF STEPS THAT ARE INVOLVED IN THE ATTACKS   │
│                            208                              │
└─────────────────────────────────────────────────────────────┘
                              │
                              ▼
┌─────────────────────────────────────────────────────────────┐
│   IN RESPONSE TO A DETERMINATION THAT THE SECURITY INDICATOR│
│   MATCHES A STEP IN ONE OF THE PLURALITY OF SEQUENCES OF    │
│    STEPS THAT ARE INVOLVED IN THE ATTACKS, IDENTIFY LINKAGE │
│    BETWEEN THE SECURITY INDICATOR TO ANOTHER SECURITY       │
│   INDICATOR FROM THE ONE OF THE PLURALITY OF SEQUENCES OF   │
│          STEPS THAT ARE INVOLVED IN THE ATTACKS             │
│                            210                              │
└─────────────────────────────────────────────────────────────┘
                              │
                              ▼
┌─────────────────────────────────────────────────────────────┐
│   IN RESPONSE TO A DETERMINATION THAT THE SECURITY INDICATOR│
│     DOES NOT MATCH ANY OF THE STEPS IN THE PLURALITY OF     │
│     SEQUENCES OF STEPS THAT ARE INVOLVED IN THE ATTACKS,    │
│  IDENTIFY THE SECURITY INDICATOR AS A SECURITY INDICATOR THAT│
│     DOES NOT MATCH ANY OF THE STEPS IN THE PLURALITY OF     │
│     SEQUENCES OF STEPS THAT ARE INVOLVED IN THE ATTACKS     │
│                            212                              │
└─────────────────────────────────────────────────────────────┘
```

```
ANALYZE DATA THAT IS RELATED TO NETWORK ACTIVITY
RELATED TO A NETWORK
302
```

```
APPLY A LINKAGE SELECTED FROM TEMPORAL, SPATIAL, AND/OR
BEHAVIORAL LINKAGES TO THE ANALYZED DATA TO DETERMINE A
PLURALITY OF SEQUENCES OF STEPS THAT ARE INVOLVED IN
ATTACKS AGAINST THE NETWORK
304
```

```
ANALYZE THE PLURALITY OF SEQUENCES OF STEPS THAT ARE
INVOLVED IN THE ATTACKS AGAINST THE NETWORK TO
DETERMINE WHETHER A SECURITY INDICATOR THAT IS RELATED
TO A POTENTIAL ATTACK AGAINST THE NETWORK MATCHES A
STEP IN ONE OF THE PLURALITY OF SEQUENCES OF STEPS THAT
ARE INVOLVED IN THE ATTACKS AGAINST THE NETWORK
306
```

```
IN RESPONSE TO A DETERMINATION THAT THE SECURITY INDICATOR
MATCHES A STEP IN ONE OF THE PLURALITY OF SEQUENCES OF
STEPS THAT ARE INVOLVED IN THE ATTACKS AGAINST THE
NETWORK, IDENTIFY A LINKAGE SELECTED FROM THE TEMPORAL,
SPATIAL, AND/OR BEHAVIORAL LINKAGES BETWEEN THE SECURITY
INDICATOR AND ANOTHER SECURITY INDICATOR FROM THE ONE OF
THE PLURALITY OF SEQUENCES OF STEPS THAT ARE INVOLVED IN
THE ATTACKS AGAINST THE NETWORK
308
```

```
IN RESPONSE TO A DETERMINATION THAT THE SECURITY INDICATOR
DOES NOT MATCH ANY OF THE STEPS IN THE PLURALITY OF
SEQUENCES OF STEPS THAT ARE INVOLVED IN THE ATTACKS
AGAINST THE NETWORK, IDENTIFY THE SECURITY INDICATOR AS A
SECURITY INDICATOR THAT DOES NOT MATCH ANY OF THE STEPS IN
THE PLURALITY OF SEQUENCES OF STEPS THAT ARE INVOLVED IN
THE ATTACKS AGAINST THE NETWORK
310
```

FIG. 3

SECURITY INDICATOR LINKAGE DETERMINATION

BACKGROUND

Security indicators typically include any type of specific or non-specific information related to a security threat. For example, a security indicator may include an Internet protocol (IP) address related to a security threat. According to another example, a security indicator may include specific information related to a particular type of malware, or any non-specific information related to malware generally. A security indicator may also include any type of parameter or attribute that may be tracked with respect to a security threat. In an event of an attack, such as a cyber-attack, a security indicator that includes, for example, an IP address related to the attack is typically placed on a watch list to prevent any further attacks from the same IP address.

BRIEF DESCRIPTION OF DRAWINGS

Features of the present disclosure are illustrated by way of example and not limited in the following figure(s), in which like numerals indicate like elements, in which:

FIG. 2 illustrates a method for security indicator linkage determination, according to an example of the present disclosure;

FIG. 3 illustrates further details of the method for security indicator linkage determination, according to an example of the present disclosure.

DETAILED DESCRIPTION

Figure 1:
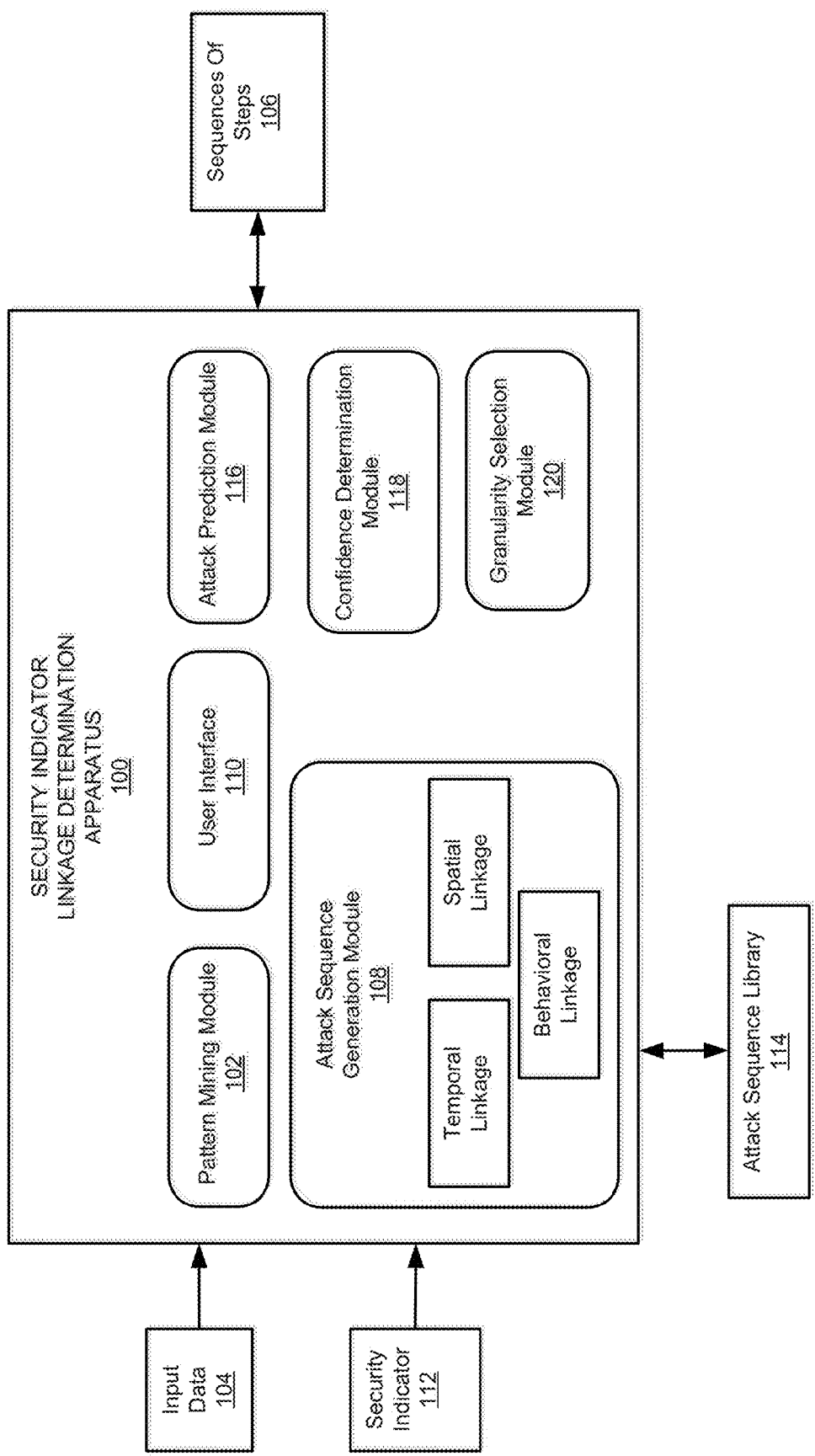
FIG. 1 illustrates an architecture of a security indicator linkage determination apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A typical attack, such as a cyber-attack, may include a plurality of phases that utilize different machines and thus different security indicators. For example, a typical attack may include a reconnaissance phase that utilizes a first set of entities, machines, or logic, and an infiltration phase that utilizes another set of entities, machines, or logic.

An entity may include an individual, organization, or any unit that may implement an attack. A machine may include any computer system that may be used to implement an attack. Further, logic may include any process related to implementation of an attack.

In order to identify such attacks, intrusion detection and prevention systems (e.g., security information and event management (SIEM) systems) typically attempt to correlate different steps of an attack on the basis of common security indicators (e.g., common IP addresses, common domains, etc.). For example, intrusion detection and prevention systems may identify an IP address being used for performing reconnaissance, and the same IP address being used for performing infiltration, to thus conclude that the IP address may be associated with an attack. However, since different steps of an attack may include different security indicators, correlation of different security indicators may be needed for identification of attacks.

According to examples, a security indicator linkage determination apparatus and a method for security indicator linkage determination are disclosed herein. The apparatus and method disclosed herein may determine linkage between different security indicators to identify an attack. The security indicators may include, for example, IP addresses, types of attacks, attack timings, domains, countries, etc. For example, the apparatus and method disclosed herein may determine linkage between different security indicators that perform reconnaissance versus infiltration. The determination of linkage between different security indicators may provide for effective, efficient, and timely identification of attacks.

According to examples, the apparatus and method disclosed herein may include a pattern mining module to parse input data that is used to determine a sequence of steps that are involved in an attack. The attack may include, for example, a cyber-attack. The sequence of steps may include, for example, reconnaissance, perimeter infiltration, internal network zone infiltration, discovery, capture, exfiltration, and/or payload installation. An attack sequence generation module may utilize the parsed input data to generate the sequence of steps that are involved in an attack. The sequence of steps may be stored in an attack sequence library. The attack sequence generation module may apply temporal, spatial, and/or behavioral linkages to the parsed input data to determine the sequence of steps that are involved in an attack.

With respect to the temporal, spatial, and behavioral linkages, the temporal linkage may be related to time, and the order (e.g., before, after) of steps in an attack sequence. For example, a report of reconnaissance from a security indicator (e.g., an IP address-1) may be followed by a report of perimeter infiltration from another security indicator (e.g., an IP address-2). Such reports may be received from a SIEM system. The attack sequence generation module may apply a temporal linkage between the reconnaissance from the IP address-1 and the perimeter infiltration from the IP address-2 to determine a sequence of steps that are involved in an attack (e.g., a temporal linkage that indicates reconnaissance occurring before perimeter infiltration).

For any further reconnaissance from the IP address-1, an attack prediction module may utilize the temporal linkage generated by the attack sequence generation module to determine that perimeter infiltration is likely to occur from the IP address-2. Similarly, for any perimeter infiltration or any activity generally by the IP address-2, the attack prediction module may utilize the temporal linkage generated by the attack sequence generation module to respectively determine that perimeter infiltration is related to the IP address-1 and/or that the IP address-2 is a malicious IP address. The attack determination by the attack prediction module may be reported to a user of the security indicator linkage determination apparatus.

A confidence determination module may determine confidence in the attack predicted by the attack prediction module. The confidence in the attack determination by the attack prediction module may be increased based on partial or full corroboration of further similar attacks. Partial corroboration may include, for example, reconnaissance from the IP address-1 and an activity other than perimeter infiltration from the IP address-2. Full corroboration may include, for example, reconnaissance from the IP address-1 and perimeter infiltration from the IP address-2.

With respect to the temporal, spatial, and behavioral linkages, the spatial linkage may be related to an origination location of an attack in a step of an attack sequence. For example, spatial linkage may include a demilitarized zone (DMZ) attack followed by access to a next network zone. Thus, spatial linkage may be related to a zone of an attack in a step of an attack sequence. In this regard, the attack sequence generation module may apply a spatial linkage between different security indicators (e.g., different IP addresses, domains, etc.) that are related to different origination and/or structural locations of an attack.

With respect to the temporal, spatial, and behavioral linkages, the behavioral linkage may be generally related to linkage between an occurrence of events and/or actions related to events. For example, behavioral linkage may include access to suspicious websites or domains followed by a relatively large amount of data transfer. According to another example, behavioral linkage may include disgruntled emails followed by transfer of data on a universal serial bus (USB) or through email. According to another example, behavioral linkage may include visiting a website that installs malware on a user's computer followed by transfer of data. In this regard, the attack sequence generation module may apply a behavioral linkage between different security indicators (e.g., different IP addresses, domains, etc.) that are related to different occurrence of events and/or actions related to events that are related to an attack.

For the apparatus and method disclosed herein, the input data that is parsed by the pattern mining module may be designated as threat identification information. The threat identification information may be classified by a SIEM system to identify a type of activity, such as suspected infiltration, reconnaissance, etc. For example, a SIEM system may ascertain whether a port scan from a particular IP address is a suspected reconnaissance, and relay such a security indicator (i.e., the IP address) to the security indicator linkage determination apparatus. Further, the SIEM system may ascertain whether another internal port scan from a particular IP address is a suspected infiltration, and relay such a security indicator (i.e., the IP address associate with the internal port scan) to the security indicator linkage determination apparatus. Thus, the SIEM system may categorize a security indicator, for example, as reconnaissance, perimeter infiltration, internal network zone infiltration, attack on a particular asset, discovery, capture, exfiltration, and/or payload installation. Based on the temporal, spatial, and behavioral linkages, the attack sequence generation module may link security indicators of different phases of an attack. The linked security indicators may be provided (e.g., exported), for example, to a client to ascertain and/or analyze an attack.

A granularity selection module may provide for the selection of a granularity related to the linkage of the security indicators of different phases of the attack. For example, the granularity related to the linkage of the security indicators may be specified as an IP level, a subnet level, a domain level, a time-of-day level, a country level, and a user-defined level.

According to an example, a security indicator linkage determination apparatus is disclosed herein and may include at least one processor, and a memory storing machine readable instructions that when executed by the at least one processor cause the at least one processor to determine linkages selected from temporal, spatial, and/or behavioral linkages for input data to determine a plurality of sequences of steps that are involved in attacks. The machine readable instructions may further cause the at least one processor to utilize the plurality of sequences of steps that are involved in the attacks to determine whether a security indicator matches a step in one of the plurality of sequences of steps that are involved in the attacks. In response to a determination that the security indicator matches a step in one of the plurality of sequences of steps that are involved in the attacks, the machine readable instructions may further cause the at least one processor to identify linkage between the security indicator to another security indicator from the one of the plurality of sequences of steps that are involved in the attacks. Further, in response to a determination that the security indicator does not match any of the steps in the plurality of sequences of steps that are involved in the attacks, the machine readable instructions may further cause the at least one processor to identify the security indicator as a security indicator that does not match any of the steps in the plurality of sequences of steps that are involved in the attacks.

FIG. 1 illustrates an architecture of a security indicator linkage determination apparatus 100 (hereinafter also referred to as "apparatus 100"), according to an example of the present disclosure. Referring to FIG. 1, the apparatus 100 is depicted as including a pattern mining module 102 to parse input data 104 that is used to determine a plurality of sequences of steps 106 that are involved in attacks. The input data may include, for example, any network activity related to a network that is being monitored by the apparatus 100 for unauthorized activity.

An attack sequence generation module 108 is to apply a linkage selected from temporal, spatial, and/or behavioral linkages to the parsed input data 104 to determine the plurality of sequences of steps 106 that are involved in the attacks. A sequence of steps of the plurality of sequences of steps 106 may include a combination selected from at least two of reconnaissance, perimeter infiltration, internal network zone infiltration, discovery, capture, exfiltration, and payload installation. The combination for any given sequence may be based on the temporal, spatial, and behavioral linkages. Alternatively, an attack may also be represented by a given step from reconnaissance, perimeter infiltration, internal network zone infiltration, discovery, capture, exfiltration, or payload installation. The temporal linkage may be related to an order of steps in a sequence of steps of the plurality of sequences of steps 106. The spatial linkage may be related to an origination location of an attack in a sequence of steps of the plurality of sequences of steps 106. The behavioral linkage may be related to an occurrence of events and/or actions related to events in a sequence of steps of the plurality of sequences of steps 106.

A user interface 110 may be used to enter a security indicator 112 that is related to a potential attack. For example, the security indicator 112 may be received by a SIEM system, and/or a user of the apparatus 100. The security indicator 112 that is related to the potential attack may include an IP address, a type of an attack, an attack timing, a domain related to an attack, and/or a location related to an attack. The user interface 110 may also be used to enter other links between security indicators of different phases of an attack to generate additional sequences of steps (to be added to the plurality of sequences of steps 106) that are involved in attacks. For example, a user of the apparatus 100 may use the user interface 110 to enter links between IP addresses related to different phases of an attack.

The plurality of sequences of steps 106 that are involved in the attacks may be stored in an attack sequence library 114. The attack sequence library 114 may be accessed as needed to store and/or retrieve the plurality of sequences of steps 106 for further analysis.

An attack prediction module 116 may utilize the plurality of sequences of steps 106 that are involved in the attacks to determine whether the security indicator 112 matches a step in one of the plurality of sequences of steps 106 that are involved in the attacks. The attack prediction module 116 may also analyze temporal, spatial, and/or behavioral linkages with respect to the security indicator 112 and the plurality of sequences of steps 106 that are involved in the attacks. In response to a determination that the security indicator 112 matches a step in one of the plurality of sequences of steps 106 that are involved in the attacks, the attack prediction module 116 may identify linkage between the security indicator 112 to another security indicator from the one of the plurality of sequences of steps 106 that are involved in the attacks. Further, in response to a determination that the security indicator 112 does not match any of the steps in the plurality of sequences of steps 106 that are involved in the attacks, the attack prediction module 116 may identify the security indicator 112 as a security indicator that does not match any of the steps in the plurality of sequences of steps 106 that are involved in the attacks.

A confidence determination module 118 may determine a confidence in an attack prediction represented by the identification of the linkage between the security indicator 112 to the another security indicator from the one of the plurality of sequences of steps 106 that are involved in the attacks.

A granularity selection module 120 may receive selection of a granularity related to the linkage between the security indicator 112 to the another security indicator from the one of the plurality of sequences of steps 106 that are involved in the attacks. The granularity may include a range from low granularity (e.g., domain level) to high granularity (e.g., IP address level). In response to the received granularity selection, the attack prediction module 116 may identify the linkage between the security indicator 112 to the another security indicator from the one of the plurality of sequences of steps 106 that are involved in the attacks.

The modules and other elements of the apparatus 100 may be machine readable instructions stored on a non-transitory computer readable medium. In this regard, the apparatus 100 may include or be a non-transitory computer readable medium. In addition, or alternatively, the modules and other elements of the apparatus 100 may be hardware or a combination of machine readable instructions and hardware.

As described herein, the plurality of sequences of steps 106 may be stored in the attack sequence library 114. According to an example, a sequence (e.g., Sequence-1) may include, in order, reconnaissance, perimeter infiltration, internal network zone infiltration, discovery, capture, and exfiltration. According to another example, a sequence (e.g., Sequence-2) may include, in order, reconnaissance, and perimeter infiltration. According to another example, a sequence (e.g., Sequence-3) may include, in order, payload-1, and payload-2.

With respect to Sequence-1 that includes, in order, reconnaissance, perimeter infiltration, internal network zone infiltration, discovery, capture, and exfiltration, this sequence may represent a computer worm. The reconnaissance may represent the preliminary assessment of general vulnerabilities (e.g., what types of services are accessible from outside a perimeter network zone) related to an entity. The perimeter infiltration may represent access into a perimeter network zone (e.g., a website) of the entity. The internal network zone infiltration may represent access into internal networks (e.g., internal websites, machines, etc.) related to the entity. The discovery may represent a determination of assets (e.g., a financial database, an intellectual property database, etc.) of an entity. The capture may represent the ascertaining of specific data (e.g., files). The exfiltration may represent the removal and/or transfer of the captured data from the internal network zone.

With respect to Sequence-2 that includes reconnaissance, and perimeter infiltration, the reconnaissance may similarly represent the preliminary assessment of general vulnerabilities (e.g., what types of services are accessible from outside a perimeter network zone) related to an entity. The perimeter infiltration may similarly represent access into a perimeter network zone (e.g., a website) of the entity.

With respect to Sequence-3 that includes payload-1, and payload-2, the payload installation may represent any type of unauthorized network packet that may be installed to implement an attack.

With respect to Sequence-2 that includes reconnaissance, and perimeter infiltration, an example of specific linkages may include linkage between a security indicator that includes IP address-1 for a reconnaissance phase, and a security indicator that includes IP address-2 for an infiltration phase. In this example, the attack prediction module 116 may utilize the plurality of sequences of steps 106 (e.g., the steps for Sequence-1, Sequence-2, and Sequence-3) that are involved in the attacks to determine whether the security indicator 112 matches a step in one of (or more than one of) the plurality of sequences of steps 106 (e.g., one of the Sequence-1, Sequence-2, or Sequence-3) that are involved in the attacks. In response to a determination that the security indicator 112 (e.g., IP address-1 for a reconnaissance phase) matches a step (e.g., reconnaissance) in one of the plurality of sequences of steps 106 (e.g., Sequence-1, or Sequence-2 (or both sequences)) that are involved in the attacks, the attack prediction module 116 may identify linkage between the security indicator 112 to another security indicator (e.g., IP address-2) from the one of the plurality of sequences of steps 106 that are involved in the attacks.

Another example of Sequence-2 may include linkage between a security indicator that includes IP subnet-1 for a reconnaissance phase and a security indicator that includes IP address-2 for an infiltration phase. In this example, in response to a determination that the security indicator 112 (e.g., IP subnet-1 for a reconnaissance phase) matches a step (e.g., reconnaissance) in one of the plurality of sequences of steps 106 (e.g., Sequence-1, or Sequence-2 (or both sequences)) that are involved in the attacks, the attack prediction module 116 may identify linkage between the security indicator 112 to another security indicator (e.g., IP address-2) from the one of the plurality of sequences of steps 106 that are involved in the attacks.

Another example of Sequence-2 may include linkage between a security indicator that includes domain/subdomain/top-level-domain for a reconnaissance phase) and a security indicator that includes domain/subdomain/top-level-domain for an infiltration phase. In this example, in response to a determination that the security indicator 112 (e.g., domain/subdomain/top-level-domain for a reconnaissance phase) matches a step (e.g., reconnaissance) in one of the plurality of sequences of steps 106 (e.g., Sequence-1, or Sequence-2 (or both sequences)) that are involved in the attacks, the attack prediction module 116 may identify linkage between the security indicator 112 to another security indicator (e.g., domain/subdomain/top-level-domain for an infiltration phase) from the one of the plurality of sequences of steps 106 that are involved in the attacks.

Another example of Sequence-2 may include linkage between a security indicator that includes time of day for a reconnaissance phase and a security indicator that includes time of day for an infiltration phase. In this example, in response to a determination that the security indicator 112 (e.g., time of day for a reconnaissance phase) matches a step (e.g., reconnaissance) in one of the plurality of sequences of steps 106 (e.g., Sequence-1, or Sequence-2 (or both sequences)) that are involved in the attacks, the attack prediction module 116 may identify linkage between the security indicator 112 to another security indicator (e.g., time of day for an infiltration phase) from the one of the plurality of sequences of steps 106 that are involved in the attacks.

Another example of Sequence-2 may include linkage between a security indicator that includes country/region for a reconnaissance phase and a security indicator that includes country/region for an infiltration phase. In this example, in response to a determination that the security indicator 112 (e.g., country/region for a reconnaissance phase) matches a step (e.g., reconnaissance) in one of the plurality of sequences of steps 106 (e.g., Sequence-1, or Sequence-2 (or both sequences)) that are involved in the attacks, the attack prediction module 116 may identify linkage between the security indicator 112 to another security indicator (e.g., country/region for an infiltration phase) from the one of the plurality of sequences of steps 106 that are involved in the attacks.

FIGS. 2 and 3 respectively illustrate flowcharts of methods 200 and 300 for security indicator linkage determination, corresponding to the example of the security indicator linkage determination apparatus 100 whose construction is described in detail above. The methods 200 and 300 may be implemented on the security indicator linkage determination apparatus 100 with reference to FIG. 1 by way of example and not limitation. The methods 200 and 300 may be practiced in other apparatus.

Referring to FIG. 2, for the method 200, at block 202, the method may include parsing input data that is used to determine a plurality of sequences of steps that are involved in attacks. For example, referring to FIG. 1, the pattern mining module 102 may parse input data 104 that is used to determine a plurality of sequences of steps 106 that are involved in attacks.

At block 204, the method may include applying a linkage selected from temporal, spatial, and/or behavioral linkages to the parsed input data to determine the plurality of sequences of steps that are involved in the attacks. For example, referring to FIG. 1, the attack sequence generation module 108 may apply a linkage selected from temporal, spatial, and/or behavioral linkages to the parsed input data 104 to determine the plurality of sequences of steps 106 that are involved in the attacks.

At block 206, the method may include receiving a security indicator that is related to a potential attack. For example, referring to FIG. 1, the user interface 110 may be used to enter (and thus receive) a security indicator 112 that is related to a potential attack.

At block 208, the method may include utilizing the plurality of sequences of steps that are involved in the attacks to determine whether the security indicator matches a step in one of the plurality of sequences of steps that are involved in the attacks. For example, referring to FIG. 1, the attack prediction module 116 may utilize the plurality of sequences of steps 106 that are involved in the attacks to determine whether the security indicator 112 matches a step in one of the plurality of sequences of steps 106 that are involved in the attacks.

In response to a determination that the security indicator matches a step in one of the plurality of sequences of steps that are involved in the attacks, at block 210, the method may include identifying linkage between the security indicator to another security indicator from the one of the plurality of sequences of steps that are involved in the attacks. For example, referring to FIG. 1, in response to a determination that the security indicator 112 matches a step in one of the plurality of sequences of steps 106 that are involved in the attacks, the attack prediction module 116 may identify linkage between the security indicator 112 to another security indicator from the one of the plurality of sequences of steps 106 that are involved in the attacks.

In response to a determination that the security indicator does not match any of the steps in the plurality of sequences of steps that are involved in the attacks, at block 212, the method may include identifying the security indicator as a security indicator that does not match any of the steps in the plurality of sequences of steps that are involved in the attacks. For example, referring to FIG. 1, in response to a determination that the security indicator 112 does not match any of the steps in the plurality of sequences of steps 106 that are involved in the attacks, the attack prediction module 116 may identify the security indicator 112 as a security indicator that does not match any of the steps in the plurality of sequences of steps 106 that are involved in the attacks.

Referring to FIG. 3, for the method 300, at block 302, the method may include analyzing data that is related to network activity related to a network. For example, referring to FIG. 1, the pattern mining module 102 may analyze data (e.g., the input data 104) that is related to network activity related to a network.

At block 304, the method may include applying a linkage selected from temporal, spatial, and/or behavioral linkages to the analyzed data to determine a plurality of sequences of steps that are involved in attacks against the network. For example, referring to FIG. 1, the attack sequence generation module 108 may apply a linkage selected from temporal, spatial, and/or behavioral linkages to the analyzed data to determine a plurality of sequences of steps that are involved in attacks against the network.

At block 306, the method may include analyzing the plurality of sequences of steps that are involved in the attacks against the network to determine whether a security indicator that is related to a potential attack against the network matches a step in one of the plurality of sequences of steps that are involved in the attacks against the network. For example, referring to FIG. 1, the attack prediction module 116 may analyze the plurality of sequences of steps that are involved in the attacks against the network to determine whether a security indicator 112 that is related to a potential attack against the network matches a step in one of the plurality of sequences of steps 106 that are involved in the attacks against the network.

In response to a determination that the security indicator matches a step in one of the plurality of sequences of steps that are involved in the attacks against the network, at block 308, the method may include identifying a linkage selected from the temporal, spatial, and/or behavioral linkages between the security indicator and another security indicator from the one of the plurality of sequences of steps that are involved in the attacks against the network. For example, referring to FIG. 1, in response to a determination that the security indicator matches a step in one of the plurality of sequences of steps that are involved in the attacks against the network, the attack prediction module 116 may identify a linkage selected from the temporal, spatial, and/or behavioral linkages between the security indicator 112 and another security indicator from the one of the plurality of sequences of steps 106 that are involved in the attacks against the network.

In response to a determination that the security indicator does not match any of the steps in the plurality of sequences of steps that are involved in the attacks against the network, at block 310, the method may include identifying the security indicator as a security indicator that does not match any of the steps in the plurality of sequences of steps that are involved in the attacks against the network. For example, referring to FIG. 1, in response to a determination that the security indicator does not match any of the steps in the plurality of sequences of steps that are involved in the attacks against the network, the attack prediction module 116 may identify the security indicator 112 as a security indicator that does not match any of the steps in the plurality of sequences of steps 106 that are involved in the attacks against the network.

Figure 4:
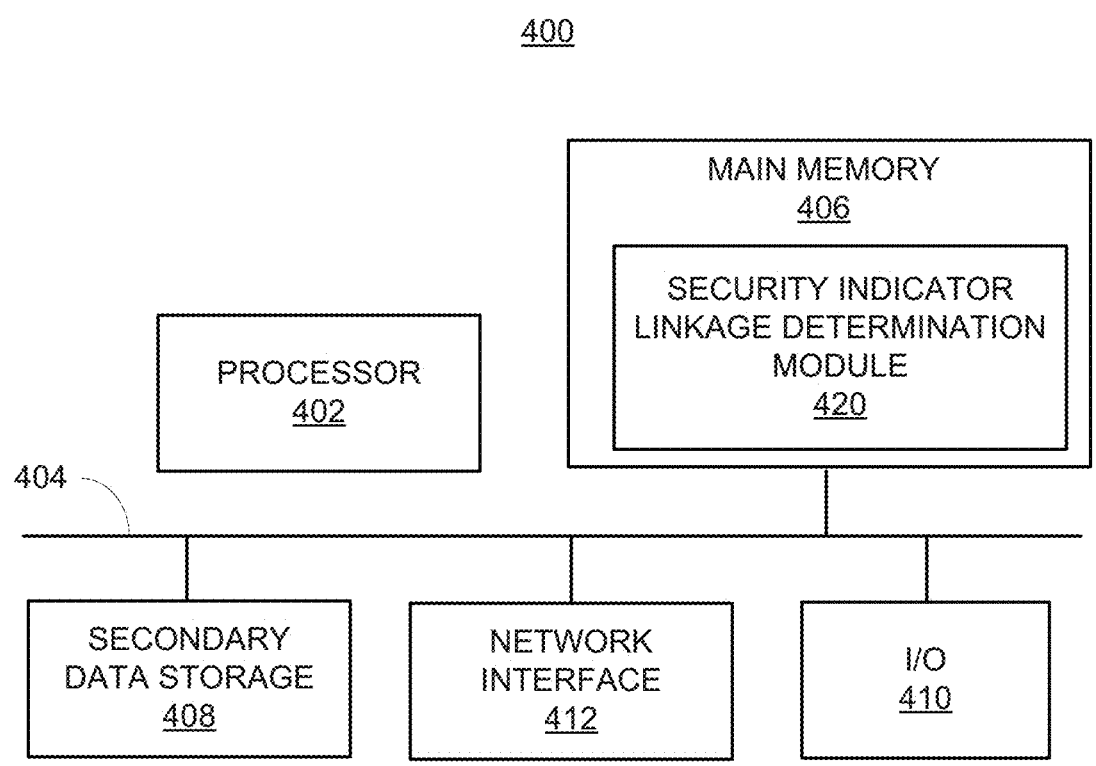
FIG. 4 illustrates a computer system, according to an example of the present disclosure.

FIG. 4 shows a computer system 400 that may be used with the examples described herein. The computer system 400 may represent a generic platform that includes components that may be in a server or another computer system. The computer system 400 may be used as a platform for the apparatus 100. The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine readable instructions performing some or all of the methods, functions and other processes described herein. Commands and data from the processor 402 may be communicated over a communication bus 404. The computer system may also include a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The main memory 406 may include a security indicator linkage determination module 420 including machine readable instructions residing in the main memory 406 during runtime and executed by the processor 402. The security indicator linkage determination module 420 may include the modules of the apparatus 100 shown in FIG. 1.

The computer system 400 may include an I/O device 410, such as a keyboard, a mouse, a display, etc. The computer system may include a network interface 412 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A non-transitory computer readable medium comprising instructions that when executed cause at least one processor to:
   parse input data;
   apply a linkage to the parsed input data to determine a plurality of sequences of steps that are involved in attacks, the linkage comprising at least one selected from among temporal, spatial, or behavioral linkages, and the plurality of sequences of steps comprises a first sequence of steps and a second sequence of steps different from the first sequence of steps;
   receive a security indicator that is related to a potential attack;
   utilize the plurality of sequences of steps to determine whether the security indicator matches a step in one of the plurality of sequences of steps;
   in response to a determination that the security indicator matches a step in one of the plurality of sequences of steps, identify a linkage between the security indicator and a further security indicator from the one of the plurality of sequences of steps; and
   predict that the potential attack is likely to occur from an address included in the further security indicator.

2. The non-transitory computer readable medium of claim 1, wherein the security indicator that is related to the potential attack includes at least one of: an Internet protocol (IP) address, a type of an attack, an attack timing, a domain related to an attack, and a location related to an attack.

3. The non-transitory computer readable medium of claim 1, wherein a sequence of steps of the plurality of sequences of steps includes a combination selected from at least two of reconnaissance, perimeter infiltration, internal network zone infiltration, discovery, capture, exfiltration, and payload installation.

4. The non-transitory computer readable medium of claim 1, wherein the temporal linkage is related to an order of steps in a sequence of steps of the plurality of sequences of steps.

5. The non-transitory computer readable medium of claim 1, wherein the spatial linkage is related to an origination location of an attack in a sequence of steps of the plurality of sequences of steps.

6. The non-transitory computer readable medium of claim 1, wherein the behavioral linkage is related to an occurrence of events and actions in a sequence of steps of the plurality of sequences of steps.

7. The non-transitory computer readable medium of claim 1, wherein the instructions when executed cause the at least one processor to:
   determine a confidence in an attack prediction represented by the identification of the linkage between the security indicator and the further security indicator.

8. The non-transitory computer readable medium of claim 1, wherein the instructions when executed cause the at least one processor to:

receive selection of a granularity related to the linkage between the security indicator and the further security indicator wherein the granularity includes a range from low granularity to high granularity; and in response to the selection of the granularity, identify the linkage between the security indicator and the further security indicator.

9. The non-transitory computer readable medium of claim 1, wherein the attacks include cyber-attacks.

10. The non-transitory computer readable medium of claim 1, wherein the instructions when executed cause the at least one processor to:

in response to a determination that the security indicator does not match any of the steps in the plurality of sequences of steps, identify the security indicator as a security indicator that does not match any of the steps in the plurality of sequences of steps.

11. The non-transitory computer readable medium of claim 1, wherein the identified linkage between the security indicator and the further security indicator is one of a temporal linkage, a spatial linkage, or a behavioral linkage.

12. The non-transitory computer readable medium of claim 1, wherein the first sequence of steps comprises a reconnaissance step and a perimeter infiltration step, and the second sequence of steps comprises installation of data payloads in a network.

13. The non-transitory computer readable medium of claim 12, wherein the first sequence of steps further comprises a data exfiltration step.

14. A system comprising:
a processor; and
a non-transitory storage medium storing instructions executable on the processor to:
determine a linkage in input data to determine a plurality of sequences of steps that are involved in attacks, the linkage comprising at least one selected from among temporal, spatial, or behavioral linkages, and the plurality of sequences of steps comprises a first sequence of steps and a second sequence of steps different from the first sequence of steps;
utilize the plurality of sequences of steps to determine whether a security indicator matches a step in one of the plurality of sequences of steps;
in response to a determination that the security indicator matches a step in one of the plurality of sequences of steps, identify a linkage between the security indicator and a further security indicator from the one of the plurality of sequences of steps; and
predict occurrence of a potential attack from an Internet protocol (IP) address included in the further security indicator.

15. The system of claim 14, wherein the security indicator comprises at least one of: an IP address, a type of an attack, an attack timing, a domain related to an attack, and a location related to an attack.

16. The system of claim 14, wherein a sequence of steps of the plurality of sequences of steps includes a combination selected from at least two of reconnaissance, perimeter infiltration, internal network zone infiltration, discovery, capture, exfiltration, and payload installation.

17. The system of claim 14, wherein the identified linkage between the security indicator and the further security indicator is one of a temporal linkage, a spatial linkage, or a behavioral linkage.

18. The system of claim 14, wherein the first sequence of steps comprises a perimeter infiltration step and a data exfiltration step, and the second sequence of steps comprises installation of data payloads in a network.

19. A method performed by a system comprising a hardware processor, comprising:

receiving data that is related to network activity of a network;

applying a linkage to the received data to determine a plurality of sequences of steps that are involved in attacks against the network, the linkage comprising at least one selected from among temporal, spatial, or behavioral linkages, and the plurality of sequences of steps comprises a first sequence of steps and a second sequence of steps different from the first sequence of steps;

analyzing the plurality of sequences of steps to determine whether a security indicator that is related to a potential attack against the network matches a step in one of the plurality of sequences of steps;

in response to a determination that the security indicator matches a step in one of the plurality of sequences of steps, identifying a linkage selected from the at least one of: the temporal, spatial, or behavioral linkages between the security indicator and a further security indicator from the one of the plurality of sequences of steps; and predicting that the potential attack is likely to occur from a network address included in the further security indicator.

20. The method of claim 19, wherein the temporal linkage is related to an order of steps in a sequence of steps of the plurality of sequences of steps, the spatial linkage is related to an origination location of an attack in a sequence of steps of the plurality of sequences of steps, and the behavioral linkage is related to an occurrence of events and actions in a sequence of steps of the plurality of sequences of steps.

21. The method of claim 19, further comprising:
determining a confidence in an attack prediction represented by the identification of the linkage between the security indicator and the further security indicator.

* * * * *